(12) United States Patent
Petersson et al.

(10) Patent No.: US 8,749,970 B2
(45) Date of Patent: Jun. 10, 2014

(54) SECURITY ENHANCING APPARATUS FOR ATTACHING TO AN ELECTRONIC DEVICE

(75) Inventors: Rutger Petersson, Malmo (SE); Patrik Lindeberg, Lund (SE); Anders Ruuswik, Vellinge (SE); Michael Harris, Westminister, MD (US)

(73) Assignee: Precise Biometrics AB, Lund (SE)

( * ) Notice: Subject to any disclaimer, the term of this patent is extended or adjusted under 35 U.S.C. 154(b) by 188 days.

(21) Appl. No.: 13/297,559

(22) Filed: Nov. 16, 2011

(65) Prior Publication Data
US 2013/0120913 A1 May 16, 2013

(51) Int. Cl.
*H05K 5/00* (2006.01)
*H05K 7/00* (2006.01)

(52) U.S. Cl.
USPC ............................... 361/679.56; 361/679.02

(58) Field of Classification Search
USPC ............. 335/679.01, 679.55, 679.56, 679.57; 324/600
See application file for complete search history.

(56) References Cited

U.S. PATENT DOCUMENTS

| | | | |
|---|---|---|---|
| 7,090,139 B2 * | 8/2006 | Kasuga et al. ................ | 235/494 |
| 7,251,474 B2 | 7/2007 | Engstrom et al. | |
| 7,612,997 B1 | 11/2009 | Diebel et al. | |
| 2002/0089410 A1 | 7/2002 | Janiak et al. | |
| 2007/0005840 A1 | 1/2007 | Cheng et al. | |
| 2010/0088439 A1 * | 4/2010 | Ang et al. ..................... | 710/105 |
| 2010/0146164 A1 | 6/2010 | Rivalsi | |
| 2010/0208424 A1 * | 8/2010 | Swan et al. .............. | 361/679.56 |
| 2010/0235546 A1 | 9/2010 | Terlizzi et al. | |
| 2011/0037428 A1 | 2/2011 | Sakaguchi et al. | |
| 2013/0077235 A1 * | 3/2013 | Pawar et al. ............ | 361/679.56 |
| 2013/0119488 A1 * | 5/2013 | Sherlock et al. .............. | 257/414 |

FOREIGN PATENT DOCUMENTS

| | | |
|---|---|---|
| EP | 1467275 A2 | 10/2004 |
| EP | 1077399 B1 | 11/2006 |
| GB | 2394080 A | 10/2002 |
| WO | 03085489 A3 | 10/2003 |
| WO | 2008087195 A1 | 7/2008 |

OTHER PUBLICATIONS

International Search Report and Written Opinion for PCTEP2012/071950; dated Apr. 23, 2013.
Invitation to Pay Additional Fees for PCT/EP2012/071950; dated Feb. 27, 2013.

* cited by examiner

*Primary Examiner* — Bernard Rojas
(74) *Attorney, Agent, or Firm* — Renner, Otto, Boisselle & Sklar, LLP.

(57) ABSTRACT

An apparatus for attaching to an electronic device, where the electronic device comprises an electrical connector, a back side, a display arranged on a side opposite to the back side, and lateral sides connecting the back side and the side opposite to the back side is disclosed. The apparatus comprises a first body; an electrical connector; a slot for insertion of a smartcard; a fingerprint reader; and circuitry connected to the electrical connector.

16 Claims, 9 Drawing Sheets

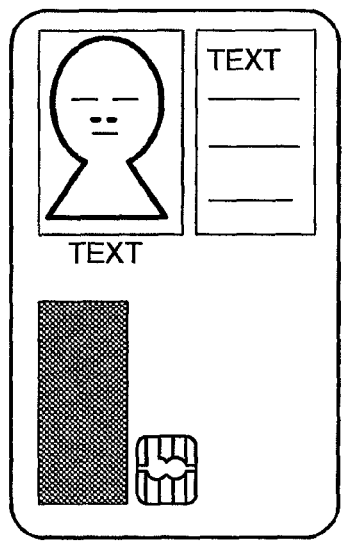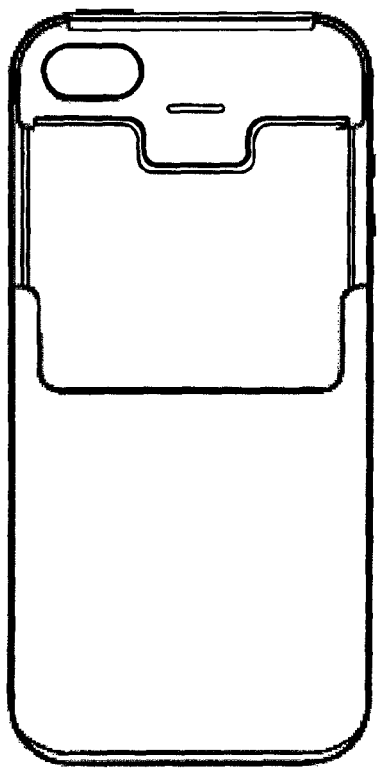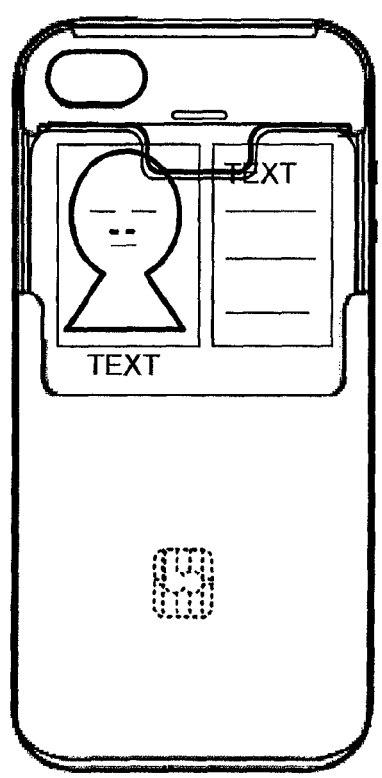
Fig. 6        Fig. 7

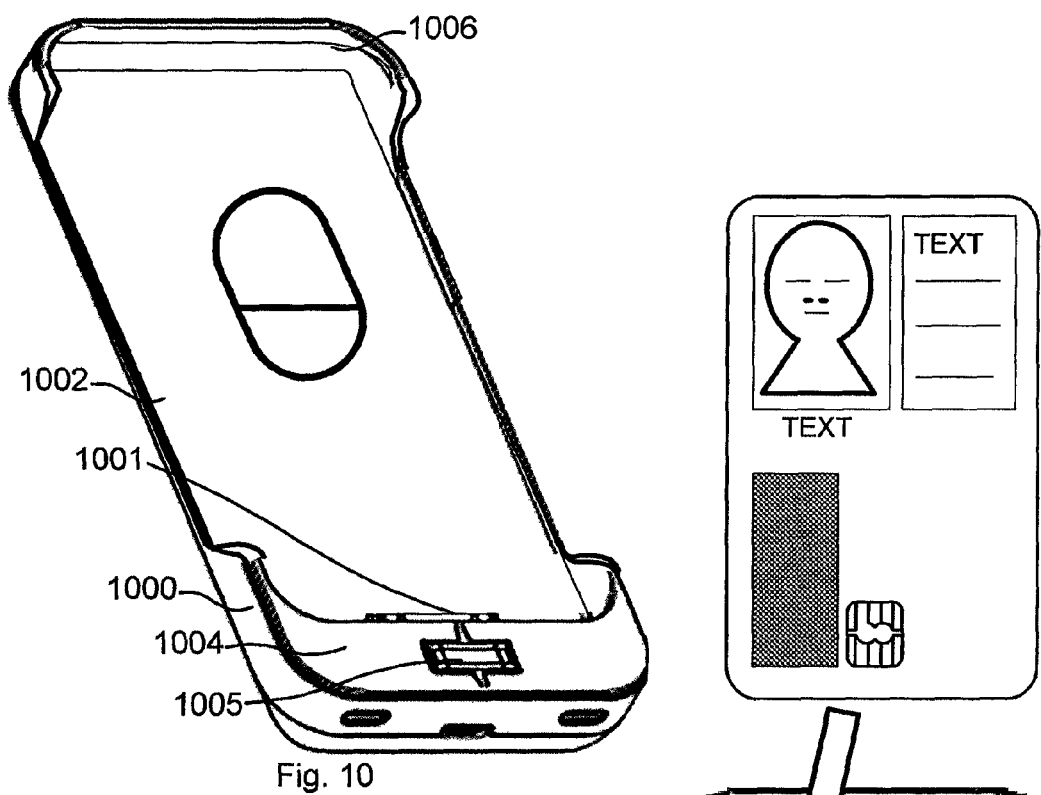
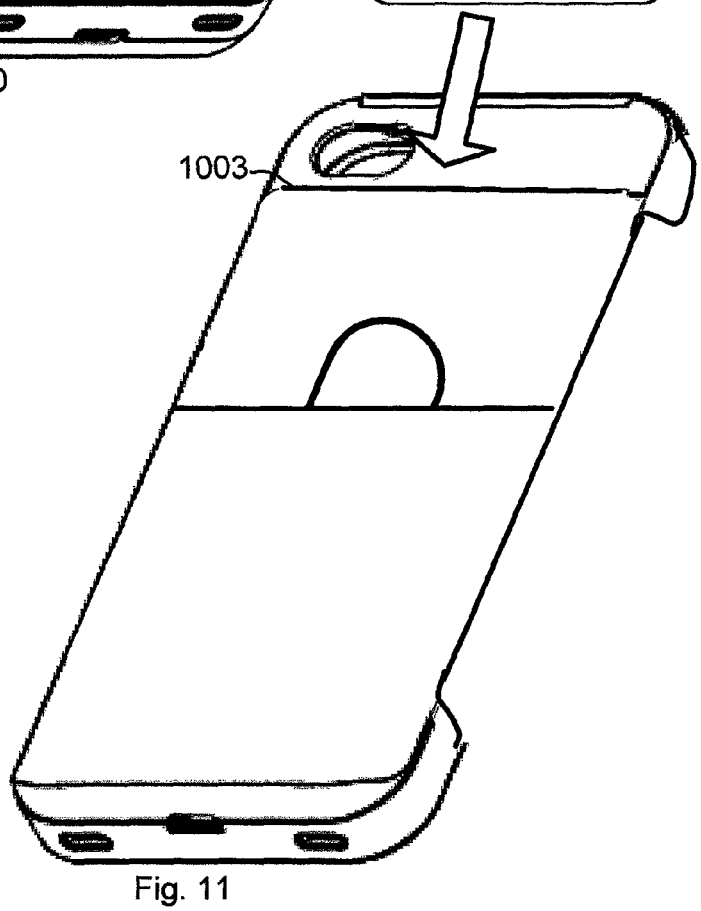
Fig. 10
Fig. 11

SECURITY ENHANCING APPARATUS FOR ATTACHING TO AN ELECTRONIC DEVICE

TECHNICAL FIELD

The present invention generally relates to an apparatus for attaching to an electronic device, wherein the apparatus is arranged to enhance security for one or more functions of the electronic device by adding biometric and smart card capabilities.

BACKGROUND

Electronic devices, particularly portable ones such as cellphones, media players, cameras, portable computers, and any mergers among those, are very capable in their functions and in their ability to hold and access data. Their portability is however a risk in sense of security issues, taking their capabilities into account. A person's or an organisation's integrity may swiftly be challenged if certain capabilities of such an electronic apparatus happens to be available to wrong hands.

Different solutions using passwords, and possibly added with encryption, exist today, but the ability to remember passwords, and the requirement to remember a lot of them, many times make the choice of passwords poor, or that the passwords are noted and many times in an insecure place. The security of such solutions is thus limited.

Electronic devices present today devoid of input mechanisms capable of providing alternative means of authentication and input. It may not be desirable to add all such means to all devices due to e.g. size, cost and/or battery consumption.

SUMMARY

An object of the invention is to at least alleviate the above stated problem. The present invention is based on the understanding that the need exists for an accessory such that input for multifactor authentication exists in the form of human fingerprint biometrics and smart card tokens. Whereas one or more input elements may exist within the accessory to provide alternate forms of input, authentication, validation, or actions to software operating on or within the electronic device.

According to a first aspect, there is provided an apparatus for attaching to an electronic device, where the electronic device comprises an electrical connector, a back side, a display arranged on a side opposite to the back side, and lateral sides connecting the back side and the side opposite to the back side. The apparatus comprises a first body comprising a back plane arranged to cover at least a part of the backside of the electronic device when attached; an electrical connector arranged to mate the electrical connector of the electronic device when attached; a slot for insertion of a smartcard arranged at the back plane part, the slot comprising electrical contacts for connecting to the smartcard when inserted; a fingerprint reader; and circuitry connected to the electrical connector, the electrical contacts and the fingerprint reader. The first body comprises a part that is arranged to abut to at least one of the lateral sides of the electronic device when attached. The apparatus further comprises a support arranged to keep the apparatus fixed to the electronic device when attached by abutting at least one further lateral side of the electronic device when attached.

The apparatus may further comprise a second body arranged to mate with the first body when attaching to the electronic device, wherein the second body comprises the support. The first body may be arranged to slide onto the electronic device from a lateral side thereof, and the second body may comprise a back plane and may be arranged to slide onto the electronic device from an opposite lateral side thereof, and the first and second bodies may be arranged to snap lock at a position of mating of the back planes of the first and second bodies. The second body may comprise a slot for insertion of a smartcard arranged at the back plane thereof such that, when attached to the electronic device, the slots of the back planes of the first and second body form the slot for insertion of the smartcard, and wherein at least a part of the back plane of the second body may be transparent such that printed information of the smartcard is visible through the back plane of the second body when the smartcard is inserted. The back plane of the first body may comprise a surface essentially transversal to the sliding direction and a surface essentially longitudinal to the sliding direction, and the back plane of the second body may comprise a surface essentially transversal to the sliding direction and a surface essentially longitudinal to the sliding direction such that the respective transversal and longitudinal surfaces mate when attached to align the first and second bodies when attached to the electronic device.

The back plane of the second body may comprise a recess or cavity at an outer part thereof such that the smart card, when inserted, is accessible to be removed.

The first body may be arranged onto the electronic device, and the second body may comprise lateral sides and may be arranged to slide onto the electronic device such that the second body encases at least one lateral side of the electronic device and at least one lateral side of the first body, and the first and second bodies may be arranged to mutually snap lock.

The first body may comprise the support, and the back plane may resilient such that when attaching the apparatus to the electronic device, the support and the part abuts at least two opposite lateral sides of the electronic device. Thereby, a single-body solution is enabled. The slot for insertion of the smartcard may be a groove arranged on a side of the back plane proximal to the electronic device when attached such that the smartcard is kept in place by the groove and the electronic device when attached.

The fingerprint reader may be a line sensor arranged to read a fingerprint upon sliding a finger over the sensor and sequentially reading a plurality of images thereof. The apparatus may further comprise a guide protrusion or guide groove arranged to provide a tactile direction indicator transversal to the elongation of the line sensor.

The fingerprint reader may be arranged to read a fingerprint from a finger held still against the reader during reading. The apparatus may further comprise a guide protrusion or groove arranged to provide a tactile indicator enabling the user to position the finger properly in sense of position and/or direction to the reader.

The apparatus may further comprise one or more recess arranged to provide access, when attached to the electronic device, for any of: a camera of the electronic device; a speaker of the electronic device; a microphone of the electronic device; and a button of the electronic device.

Where the electronic device is arranged to, through its electrical connector, detect an accessory by identifying on one or more of its pins a short circuit to ground and/or a predefined resistance to ground, the circuitry may further comprise a controllable impedance circuit arranged to provide, to the one or more corresponding pins of the electrical connector of the first body, short circuit and/or a predefined resistance to ground corresponding to a selected mode of operation of the apparatus. The impedance circuit may comprise a first junction field effect transistor, JFET, connected with its source to a ground potential, its drain to a first one of the one or more pins corresponding to accessory detection pins, and its gate connected to a voltage supply source of, or connectable to, the apparatus, via a resistor and the gate is further connected to a first control switch of the circuitry arranged to selectably short circuit the gate voltage to a ground voltage, i.e. such that the voltage over gate-source is about zero. The impedance circuit may comprise a second junction field effect transistor, JFET, connected with its source to a ground potential, its drain to a second one of the one or more pins corresponding to accessory detection pins via a resistor of a predefined size, and its gate connected to a voltage supply source of, or connectable to, the apparatus, via a resistor and the gate is further connected to a second control switch of the circuitry arranged to selectably short circuit the gate voltage to a ground voltage, i.e. such that the voltage over gate-source is about zero.

The apparatus may further comprise a Universal Serial Bus, USB, connector arranged to enable connection to a USB host, wherein the USB connector is connected to the circuitry. The voltage supply source may be provided through the USB connector.

The circuitry may be controlled by a processor on which a hardware-interfacing software is executed for performing the control, and upon the electronic device being arranged to interact with the apparatus under control of an executed application, any update of the hardware-interfacing software is provided through an update of the application of the electronic device.

The circuitry may be arranged for extracting features from a fingerprint image read by the fingerprint reader.

According to a second aspect, there is provides a combined device comprising an electronic device comprising an electrical connector, a back side, a display arranged on a side opposite to the back side, and lateral sides connecting the back side and the side opposite to the back side; and an apparatus according to the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 6 schematically illustrates insertion of a smart card into an apparatus according to an embodiment.

FIG. 7 schematically illustrates an apparatus as of FIG. 6 with the smart card inserted.

FIG. 10 illustrates an apparatus according to an embodiment.

FIG. 11 illustrates insertion of a smart card into an apparatus as of FIG. 10.

DETAILED DESCRIPTION

Figure 1:
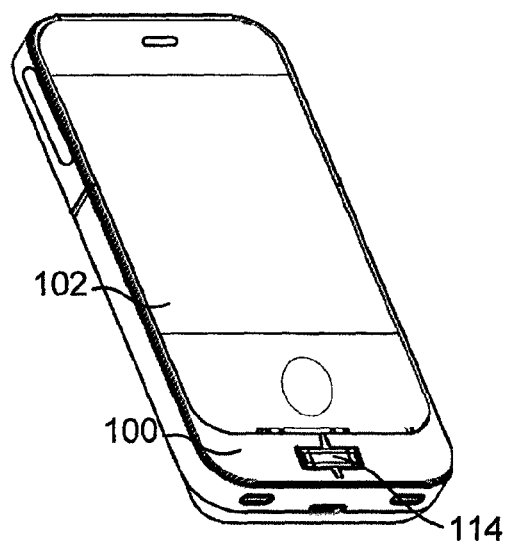
FIG. 1 illustrates an apparatus according to an embodiment attached with an electronic device.
Figure 2:
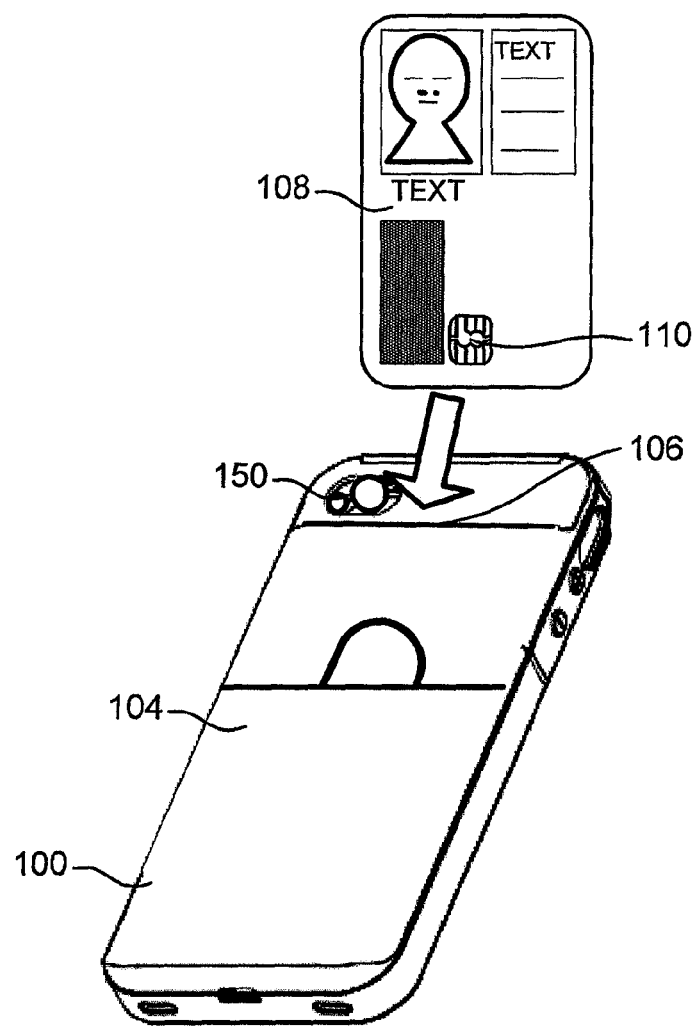
FIG. 2 schematically illustrates insertion of a smart card into an apparatus according to an embodiment.

FIGS. 1 and 2 schematically illustrate the obverse and reverse views of an apparatus 100 for attaching to an electronic device 102, which is shown in attached position. A suitable electronic device 102 is illustrated in detached position in FIGS. 5 and 13. The electronic device 102 comprises (reference numerals depicted in FIG. 13) an electrical connector 103, a back side 105, a display 107 arranged on a side 109 opposite to the back side 105, and lateral sides 111, 113, 115, 117 connecting the back side 105 and the side 109 opposite to the back side 105, which is a construction that is fairly popular among devices such as mobile phones, communicators, smartphones, personal digital assistants, and the like.

The apparatus 100 comprises a back plane 104 arranged to cover at least a part of the backside 105 of the electronic device 102 when attached. The back plane 104 is arranged to provide a part of the support for forming the usable combination of the apparatus 100 and the electronic device 102, which thus forms a combined device providing enhanced features compared to the electronic device 102 alone. The back plane 104 further provides the function of having a slot 106 for insertion of a smartcard 108. The size and position of the backplane 104 makes it particularly suitable for this. Inside the slot, electrical contacts (not visible in FIGS. 1 and 2) for connecting to the corresponding contacts 110 of the smartcard 108, when inserted, are provided. Further, an electrical connector 112 (not visible in FIGS. 1 and 2; reference numeral depicted in FIG. 4) of the apparatus 100 is arranged to mate the electrical connector 103 of the electronic device when attached.

The apparatus 100 also comprises fingerprint reader 114. The fingerprint reader 114, together with its associated algorithms for identification/authentication and security functions for access to data and/or applications/functions of the electronic device provides for the enhanced functionality of the combined device referred to above.

The apparatus 100 further comprises circuitry connected to the electrical connector 112, the electrical contacts and the fingerprint reader 114. The circuitry is preferably controlled by a processor thereof on which a hardware-interfacing software, commonly called firmware, is executed for performing the control. The algorithms associated with the fingerprint reader, referenced to above, may be performed at least partly by the circuitry. Here, it is to be noted that such algorithms are normally a joint effort by the circuitry, the attached electronic device 102 and an inserted smartcard 108, and how these efforts are divided between them is a choice of design, and may for example depend on the demands of the functionality, available processing power in respect of the three entities, and desired degree of versatility. The circuitry is for example particularly suitable for taking care of feature extraction from read fingerprints. Related to the topic of cooperation between these entities, a particularly suitable use case is to be mentioned. In this use case, the electronic device is arranged to interact with the apparatus under control of an executed application. This can be a downloaded application which comprises the executable code which enables the electronic device 102 to perform a certain task. The apparatus 100, which may be mandatory for performing that particular task, and/or for being able to use the application, may benefit from the mechanism of such downloadable applications. Such applications are commonly provided with updates, which the electronic device downloads from time to time. Upon any update of the firmware of the apparatus, that update is provided through an update of the application of the electronic device, e.g. the firmware is appended to an update of the application, and is then provided to the apparatus 100 when attached. Thereby, no complex mechanism or infrastructure for the update of the firmware of the apparatus 100 is needed.

To provide a usable combined device as referred to above, it is desirable that the mechanical fit is such that when attached, the combined device is kept securely together, while if the electronic device is to be detached, that should be rather simple and certainly without demands for certain tools. This is achieved by the apparatus 100 having a part that is arranged to abut to at least one of the lateral sides of the electronic device when attached. This part is preferably also the part where the electrical connectors of the electronic device 102 and the apparatus 100 mates. The apparatus then also comprises an support arranged to keep the apparatus fixed to the electronic device when attached by abutting at least one further lateral side of the electronic device when attached. This is solved by some variants, which are demonstrated below for a few representative embodiments.

Figure 3:
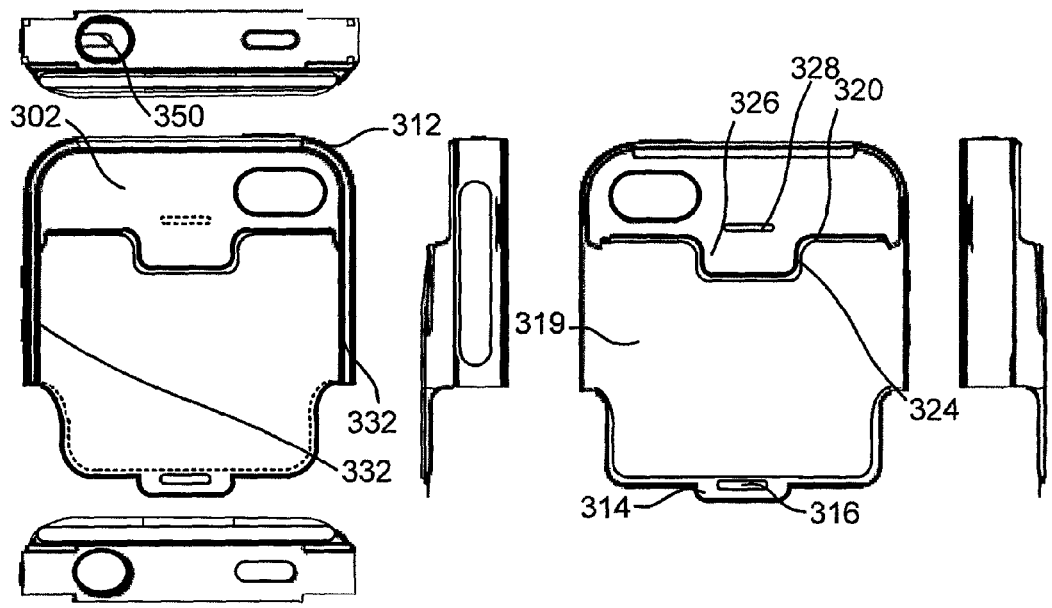
FIG. 3 illustrates views of a body of an apparatus according to an embodiment.
Figure 4:
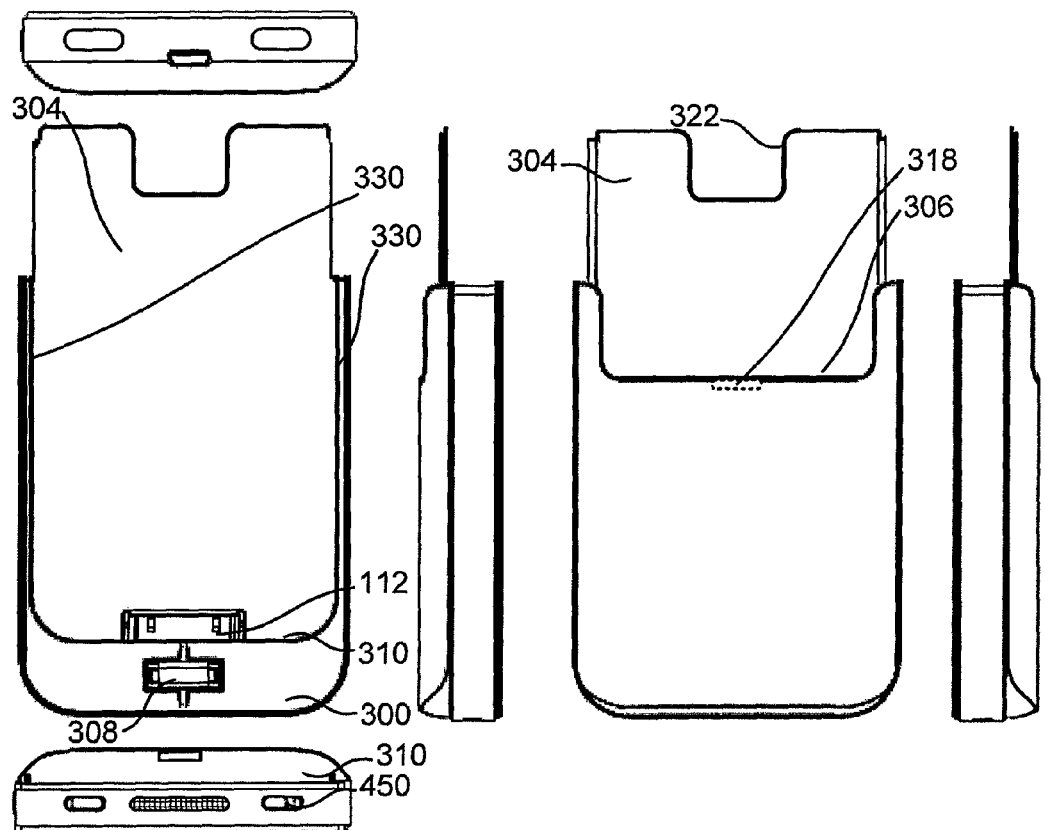
FIG. 4 illustrates views of another body of the apparatus according to the embodiment of FIG. 3.
Figure 5:
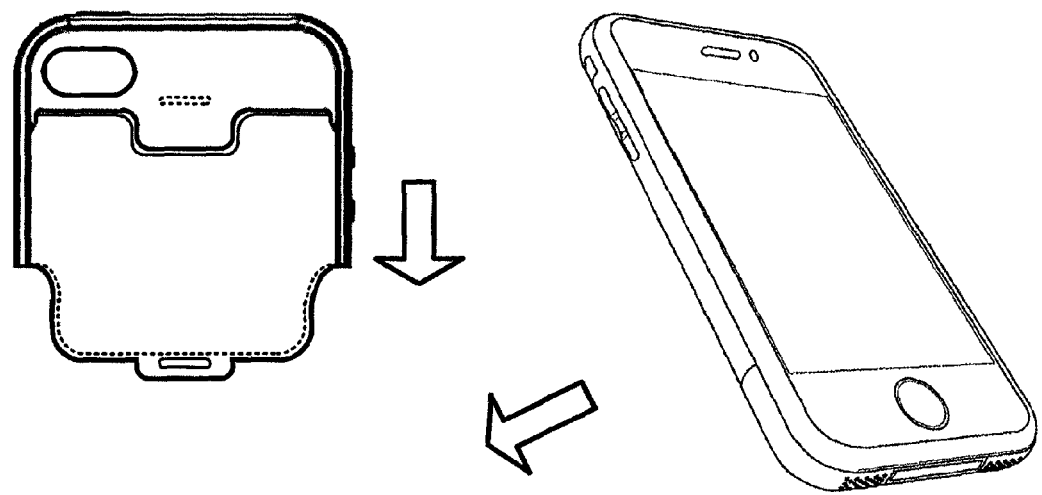
FIG. 5 schematically illustrates assembly of an apparatus according to an embodiment with an electronic device.
Figure 5:
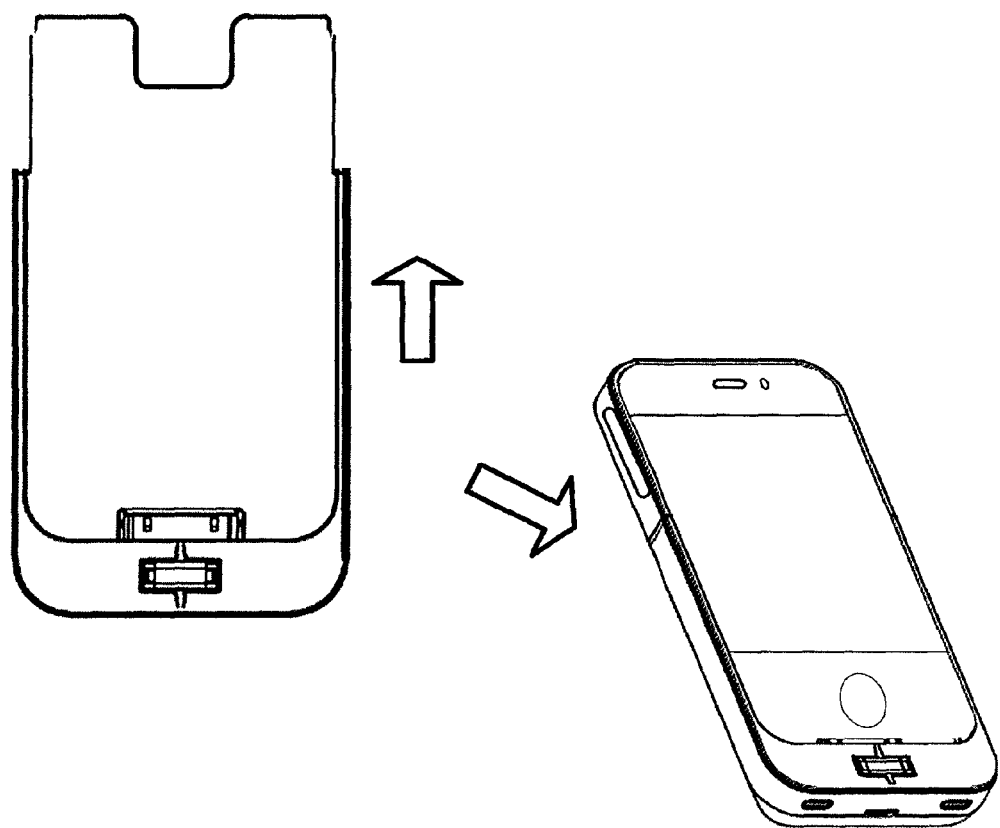

FIGS. 3 and 4 illustrate an apparatus according to an embodiment, where the apparatus comprises two bodies 300, 302 which are arranged to mate to keep the electronic device to form the usable combined device, which is illustrated in FIG. 5. FIG. 4 illustrates a first body 300 and FIG. 3 illustrates a second body 302, which bodies are arranged to mate. Both in FIG. 3 and FIG. 4, the respective body 300, 302 are illustrated in orthographic views which together show all sides of the respective bodies 300, 302.

The first body 300 comprises a back plane 304 arranged to cover at least a part of the backside of the electronic device when attached, the electrical connector 112 arranged to mate the electrical connector of the electronic device when attached, a slot 306 for insertion of the smartcard arranged at the back plane part and comprising the electrical contacts for connecting to the smartcard when inserted. The first body 300 also comprises the fingerprint reader 308, and the circuitry which is connected to the electrical connector, the electrical contacts and the fingerprint reader. The first body 300 comprises a part 310 that is arranged to abut to at least one of the lateral sides of the electronic device when attached, which here can be seen to be arranged to abut the whole of one of the lateral sides, and parts of two other lateral sides of an electronic device.

The second body 302, which is arranged to mate with the first body 300 when attaching to the electronic device, can here be seen to comprise a surface 312 for abutting at least one further lateral side of the electronic device when attached, i.e. the opposite lateral side to the one abutted entirely by the first body 300, and also parts of two other lateral sides of the electronic device. Thus, in this embodiment all lateral sides of the electronic device will be encased by the first and second bodies when attached. Attaching can be performed for example by sliding the first body onto the electronic device from a lateral side thereof, and sliding the second body onto the electronic device from an opposite lateral side thereof, and the first and second bodies can snap lock at a position of mating of the back planes of the first and second bodies 300, 302, by corresponding means, here illustrate as a protrusion 314 with a recess or cavity 316 of the second body 302 which is arranged to correspond to a protrusion 318 of the first body 300 arranged to snap into the recess or cavity 316 since the protrusion 314 is slightly resilient. The arrangement of protrusions and recesses or cavities can of course be arranged such that the elements 314, 316 are arranged on the first body and the element 318 is arranged on the second body. Further, the protrusion 318 can be substituted by a recess or cavity if the recess or cavity 316 is substituted by a protrusion in any of the structures demonstrated above.

The second body 302 comprises a slot 320 for insertion of the smartcard arranged at the back plane 319 thereof such that, when attached to the electronic device, the slots 306, 320 of the back planes 304, 319 of the first and second bodies 300, 302 form the slot for insertion of the smartcard. The whole or at least a part of the back plane 319 of the second body 302 is transparent such that printed information of the smartcard is visible through the back plane 319 of the second body 302 when the smartcard is inserted, as is illustrated by FIGS. 6 and 7.

The back plane of the first body 304 can comprise at least one surface 322 essentially transversal to the sliding direction of mounting and a surface essentially longitudinal to the sliding direction of mounting. The back plane of the second body 302 can comprise at least one surface 324 essentially transversal to the sliding direction and at least one surface essentially longitudinal to the sliding direction such that the respective transversal and longitudinal surfaces 322, 324 mate when attached to align the first and second bodies when attached to the electronic device; this will provide aligned fit and stability to the combined device.

The back plane of the second body 302 can comprise a recess 326 at an outer part thereof such that the smart card, when inserted, is accessible to be removed. A bulge 328 provided on the second body 302 can be provided to keep the smart card in place when inserted.

The first body 304 can be arranged to slide onto the electronic device, such that the electrical connector 112 mates with a corresponding connector of the electronic device. The first body 304 can comprise lateral sides 330. The second body 302 can comprise lateral sides 332 and be arranged to slide onto the electronic device from the other side thereof such that the second body 302 encases at least one lateral side of the electronic device by the lateral sides 332 and at least one lateral side 330 of the first body 304 encases at least one lateral side of the electronic device, and the first and second bodies are arranged to mutually snap lock, e.g. by elements 314, 316 and 318.

Figure 8:
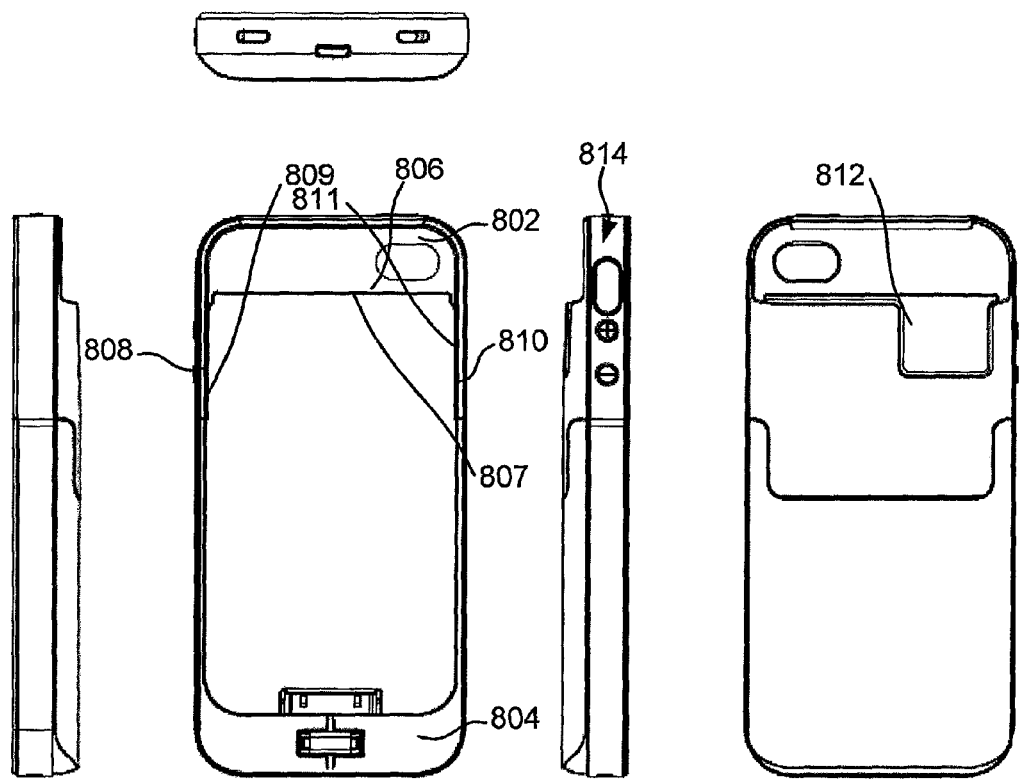
FIG. 8 illustrates views of mated bodies of an apparatus according to an embodiment.
Figure 8:
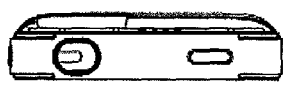
Figure 9:
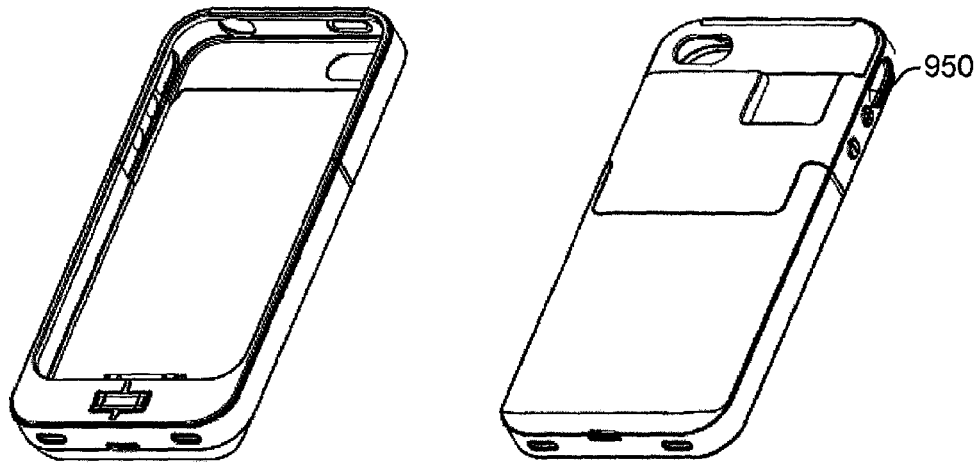
FIG. 9 illustrates perspective views of mated bodies of an apparatus according to an embodiment.

FIG. 5 illustrates mounting the first and second bodies on an electronic device to form a single functional unit. FIG. 6 illustrates insertion of a smart card into the functional unit, wherein FIG. 7 illustrates the functional unit with the smart card inserted. FIG. 7 also illustrates, depicted by dotted lines, the contacts of the smart card, in reality hidden inside the card slot, to indicate the position of corresponding contacts of the first body to mate with the contacts of the smart card. FIGS. 8 and 9 illustrate a first and a second body 802, 804 mated, but without the electronic device being involved. The illustrations are shown to depict both how surfaces 806, 807, 808, 809, 810, 811 of the first and second bodies 802, 804 mate, and how a variant of the card slot 812 and mating surfaces can be arranged. FIGS. 8 and 9 also depicts that cavities for accessing keys or buttons of the electronic apparatus can be substituted by keys or buttons 814 arranged to mechanically interact with keys or buttons of the apparatus.

Figure 12:
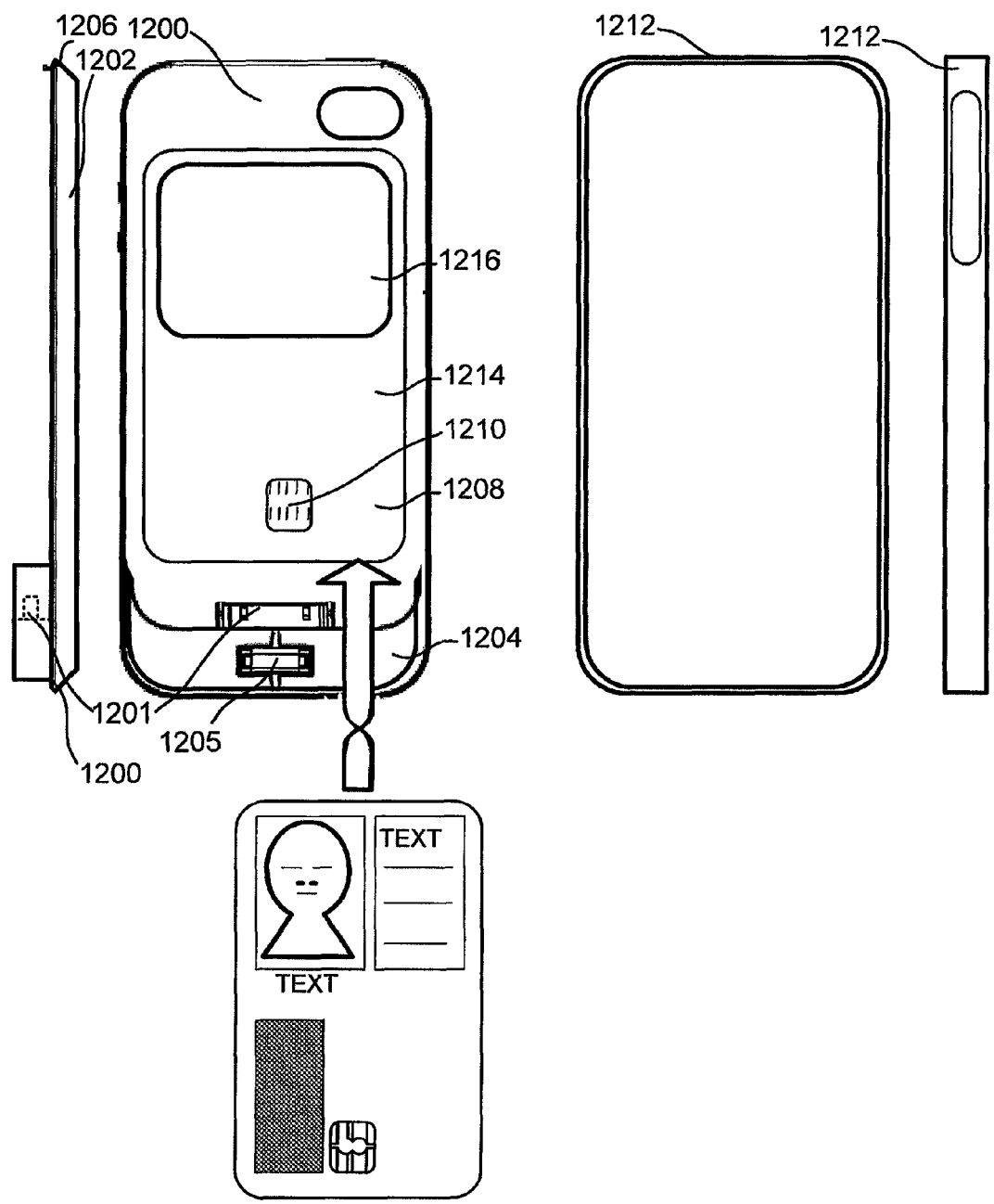
FIG. 12 illustrates an apparatus according to an embodiment.

FIGS. 10 and 11 illustrate a single body solution. A single body 1000 comprises similar functionality as demonstrated for the two-body solution, but the mechanical properties are somehow different, as will be demonstrated here. The single body 1000 comprises circuitry connected to an electrical connector 1001 arranged to mate a corresponding connector at the electronic device, a smart card reader, preferably arranged as a card slot 1003 but may be arranged for example as illustrated in FIG. 12, comprising electrical contacts arranged to mate contacts of a smart card and a fingerprint reader 1005. A back plane 1002 of the single body 1000 is resilient such that when attaching the apparatus to the electronic device, a part 1004 having the electrical connector 1001 and a support 1006 arranged to face an opposite lateral side of the electronic device abuts at least two opposite lateral sides of the electronic device. The electronic device is thus at least partly encased on its lateral sides such that it is kept in place. By the resilient back plane 1002, the single body is wrapped onto the electronic device.

Figure 13:
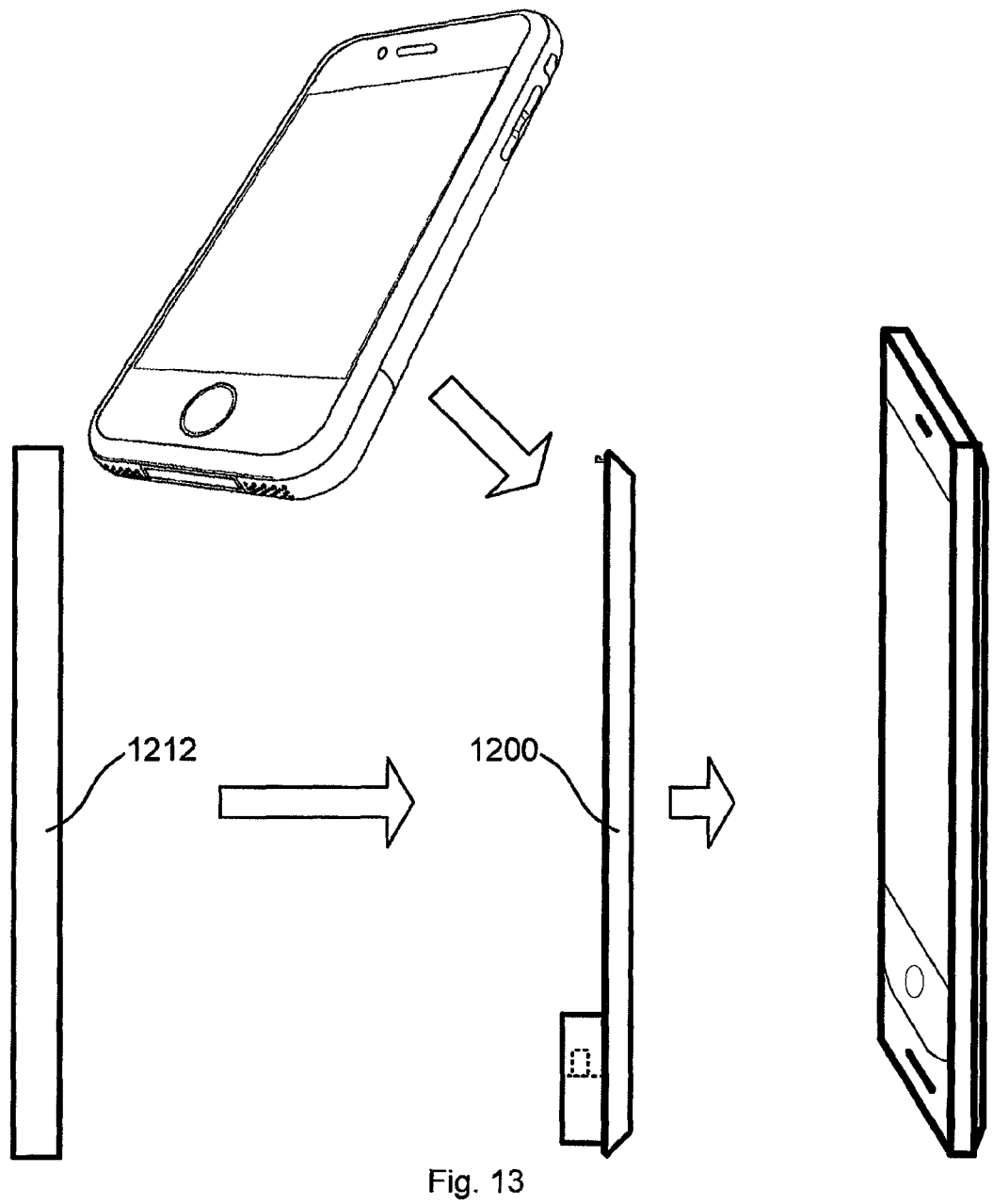
FIG. 13 illustrates assembly of an apparatus according to an embodiment with an electronic apparatus.

FIGS. 12 and 13 illustrates an alternative solution. A body 1200 comprises circuitry connected to an electrical connector 1201 arranged to mate a corresponding connector at the electronic device, a smart card reader 1208, comprising electrical contacts 1210 arranged to mate contacts of a smart card, and a fingerprint reader 1205. A part 1204 having the electrical connector 1201 is arranged to face a lateral side of the electronic device. A back plane 1202 is rigid and a frame 1205 is arranged to be attached around the part 1204 and the electronic device when it is attached, wherein a lock mechanism 1206 which is arranged to lock with the frame 1212 when it is attached. The lock may be released by actuating an unlock key or lever. The smart card reader 1208 can comprise a groove 1214 arranged on a side of the back plane proximal to the electronic device when attached such that the smartcard is kept in place by the groove and the electronic device when attached. A transparent part 1216 of the back plane 1202 can enable visual information on the smart card from outside when the functional unit is assembled.

In the embodiments demonstrated above, the fingerprint reader can be a line sensor, as depicted in FIGS. 1, 4, 5, 8, 9. 10, 12 and 13, arranged to read a fingerprint upon sliding a finger over the sensor and sequentially reading a plurality of images thereof. The apparatus can further comprise a finger guide protrusion or guide groove arranged to provide a tactile direction indicator transversal to the elongation of the line sensor, as depicted in FIGS. 1, 4, 5, 8, 9, 10 and 12. The apparatus can also be provided without such direction indicator, as depicted in FIG. 13. The tactile guide can for example be arranged centred along the elongation of the line sensor.

Figure 14:
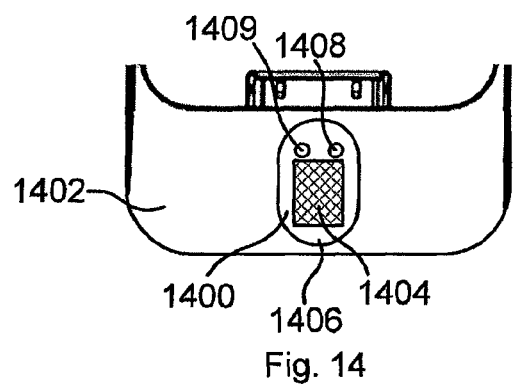
FIG. 14 illustrates a fingerprint reader according to an embodiment.

Alternatively, the fingerprint reader is arranged to read a fingerprint from a finger held still against the reader during reading, which is often referred to as a flat bed sensor and an image or representation of a major part of a fingertip, where the fingerprint information is present is present, is read. For consistent positioning of the finger, such that the read fingerprint image or representation is fairly easy to compare with a stored template of the fingerprint, the apparatus can further comprises a guide protrusion or groove arranged to provide a tactile indicator enabling the user to position the finger properly in sense of position and/or direction to the reader. An example of such fingerprint reader is depicted in FIG. 14, where the fingerprint reader 1400 is arranged on the electronic apparatus 1402. The fingerprint reader 1400 has its sensor surface 1404 where the major part of the fingertip is to be arranged at reading. The finger positioning is in this example aided both by a groove 1406 arranged around the sensor, and bulges 1408, 1409 arranged such that they can be, by tactile recognition by the finger applied, felt and the finger is easily enabled to be put in the right position and direction by the user. The example depicted in FIG. 14 is applicable to any of the embodiments demonstrated herein as an alternative to the otherwise depicted line sensor. The apparatus can also be provided with such flat bed sensor without such direction or position indicator. The apparatus can further comprise one or more extrusions arranged to provide access, when attached to the electronic device, for any of:

a camera of the electronic device, as illustrated by reference numeral 150 in FIG. 2;

a speaker of the electronic device, as illustrated by reference numeral 350 in FIG. 3;

a microphone of the electronic device, as illustrated by reference numeral 450 in FIG. 4; and a button of the electronic device, as illustrated by reference numeral 950 in FIG. 9.

The electronic device, e.g. a smartphone, can be arranged to, through its electrical connector to the apparatus, detect an accessory, e.g. the apparatus, by identifying on one or more of its pins a short circuit to ground and/or a predefined resistance to ground. This can be used by arranging the circuitry of the apparatus to further comprise, illustrated in FIGS. 15 and 16, a controllable impedance circuit 1500, 1600 arranged to provide, to the one or more corresponding pins of the electrical connector, short circuit to ground and/or a predefined resistance corresponding to a selected mode of operation of the apparatus. Thereby will the electronic device be able to detect attachment to the apparatus and/or adapt its mode of operation accordingly.

The impedance circuit 1500 can comprise a first junction field effect transistor, JFET, 1502 connected with its source to a ground potential, its drain to the of the one or more pins corresponding to accessory detection pins, and its gate connected to a resistor to a voltage supply source of, or connectable to, the apparatus, and the gate is further connected to a first control switch 1504 of the circuitry arranged to selectably, by closing the switch 1504, pull the gate voltage towards a ground voltage, i.e. short circuit gate to ground such that the voltage over gate-source becomes about zero, wherein the accessory pin will experience that nothing is connected thereto. When the apparatus is connected to the electronic device, i.e. there is a supply voltage applied, and the switch is open, the JFET 1502 will disconnect the accessory pin from ground since the supply voltage applied to the gate will pinch the JFET 1502 since gate-source voltage becomes about the supply voltage, and the electronic device will consider the situation as no accessory is connected, while if the apparatus is not connected to a supply voltage, the gate voltage is the same as the source voltage, e.g. grounded through discharge resistor $R_2$, wherein the JFET 1502 is conducting through drain-source, and the pin is in a state where it is enabled to detect the apparatus as a connected accessory. This enables virtual disconnection/connection of the accessory, i.e. the apparatus, which can be used for situations such as changing role, i.e. operation mode, of the apparatus. An example of this is provided below for USB connection where the supply voltage is provided by the USB connection. An advantage of the demonstrated JFET circuit 1500 is that the JFET will be in conductive state when no voltage is provided to the gate. That is, the circuit will work although not being powered at connection.

The impedance circuit 1600 can comprise a second junction field effect transistor, JFET, 1602 connected with its source to a ground potential, its drain to another one of the one or more pins corresponding to accessory detection pins, e.g. accessory identity (ID) pin, via a resistor $R_{ID}$ of a predefined size, and its gate connected to a resistor $R_1$ further connected to a second control switch 1604 of the circuitry arranged to selectably short circuit the gate voltage to a ground voltage, i.e. such that voltage over gate-source is about zero. The function of the second JFET 1602 and the second switch 1604 is similar to what has been demonstrated for JFET 1502 and switch 1504 of FIG. 15.

In the embodiments of the impedance circuit demonstrated above, it should be understood that they can be used in combination or sole. In the circuits demonstrated with reference to FIGS. 15 and 16, there is optionally provided a discharge resistor $R_2$ which is arranged to discharge any capacitors present or inherent in the circuitry when the apparatus is disconnected from the electronic apparatus such that the gate voltage falls sufficiently quick upon disconnection. The resistor $R_2$ is thus selected based on such present capacitances and the demand for fall time for the gate voltage.

Figure 15:
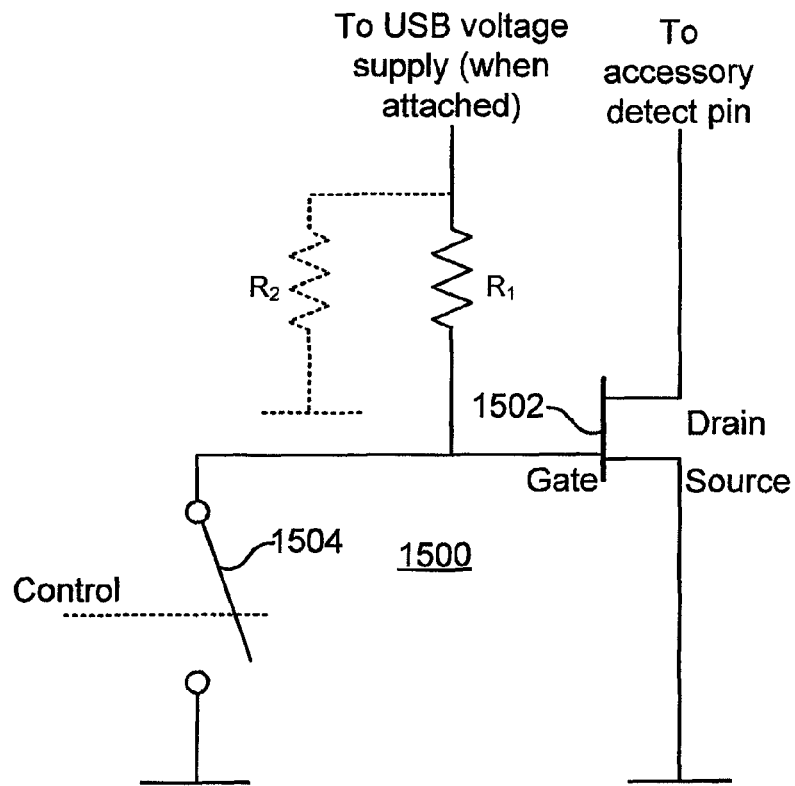
FIG. 15 is a schematic circuit diagram illustrating an embodiment.

The apparatus can comprise a Universal Serial Bus, USB, connector arranged to enable connection to a USB host, wherein the USB connector is connected to the circuitry, wherein the voltage supply source is provided through the USB connector. The voltage supplied through the USB connector can thus, by the circuitry and its JFET connection automatically enable switching mode of the electronic device. FIG. 15 schematically illustrates the principles of such circuitry. The USB connection provides, through its $V_{bus}$ pin, a supply voltage of about 5V when connected, which is provided through the resistor $R_1$. The voltage of the supply is provided to the gate of a JFET 1502. The drain terminal of the JFET 1502 is connected to an accessory detect pin of the connector, and thus to the connected electronic device. The JFET 1502 is thus forced into a state where no connection between drain and source is provided, and the accessory, i.e. the apparatus is virtually disconnected. By closing the switch 1504, virtual reconnection can be made.

The nature of the JFET 1502, 1602, which is of p-channel type, is that the channel is pinched, i.e. there is no electrical connection between its drain and source, if the voltage between its gate and source is high enough, say a few volts. When the switch 1504, 1604 connected to the gate terminal is open, the voltage at the gate terminal is defined by the voltage supplied, and the voltage at the source terminal is zero since it is connected to ground. By the short circuit, achieved through the switch 1504, 1605, of the gate to same potential as the source, the channel is pinched when the switch is closed. The effect is that the electronic device will detect that no accessory is connected since there is no connection between drain and source of the JFET 1502, 1602 and thus no connection from the accessory pin to a reference voltage, i.e. ground, and the mode is set to operate as no accessory is present when the USB is connected. This can be used for enabling the USB to operate with the electronic device without interference with the accessory, i.e. the apparatus, or that the apparatus after a while, when for example some handshake procedure is set, closes the switch 1504, i.e. under control of the circuitry of the apparatus, which will make the electronic device detect the accessory and change mode of operation accordingly. The latter is found to be a desired way of changing mode from "accessory connected" to "USB connected". This can also be used for changing mode of operation of the apparatus, wherein another resistance $R_{ID}$ is applied, as will be further demonstrated below, for indicating that to the electronic device. A similar virtual disconnection/reconnection can be used to achieve the switch of mode of operation.

Figure 16:
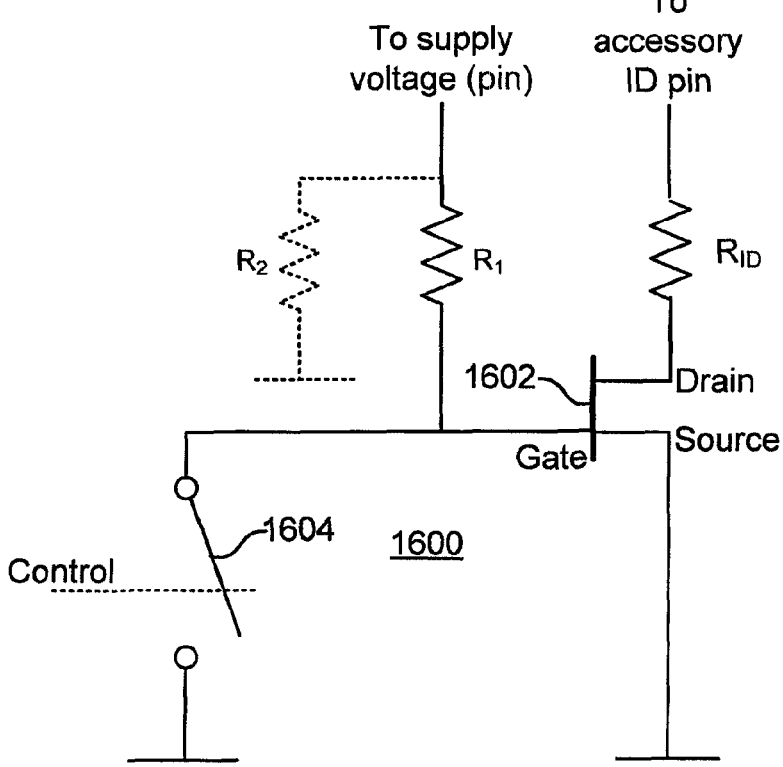
FIG. 16 is a schematic circuit diagram illustrating an embodiment.

FIG. 16 illustrates a similar circuit, but here connected to an accessory identification, ID, pin. The electronic apparatus can be arranged to detect different types of accessories depending on the amount of resistance to ground detected at accessory ID pin. The apparatus is then able to choose to connect a certain identification resistance $R_{ID}$ to the ID pin to identify itself, or to identify the present role the apparatus intends to work in. There can thus be several such circuits, one for each role, which can be selectively connected to the ID pin.

The use of a p-channel JFET this way, with its source grounded instead of the more common application where the source is connected to a supply voltage and drain is connected to ground via a resistor, wherein the output is achieved over the resistor, enables a circuitry with very few components, robust behaviour, and versatility to be applicable for connecting the apparatus to most electronic devices. The robust behaviour is implied by the circuit enabling the full supply voltage to be applied over gate-source, and no voltages above supply voltage, as if e.g. a traditional connection of a p-channel JFET was used, or negative voltages, as if e.g. an n-channel JFET was used, are needed to be created. The versatility becomes inherent by the fact that there is commonly a supply voltage available, and the simple detection/identification by the electronic device sensing of grounded and/or resistances to ground is commonly used. For making the circuitry versatile for several devices utilising different resistance values, a bank of such impedance circuits can be provided and the applicable impedance circuits are enabled by controlling the respective switches among them. This will further enhance production of circuits for a series of products, i.e. apparatuses, dedicated to different electronic apparatuses, where the same circuitry can be used for all the products.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An apparatus for attaching to an electronic device, the electronic device comprising an electrical connector, a back side, a display arranged on a side opposite to the back side, and lateral sides connecting the back side and the side opposite to the back side, the apparatus comprising
   a first body comprising
      a back plane arranged to cover at least a part of the backside of the electronic device when attached;
      an electrical connector arranged to mate the electrical connector of the electronic device when attached;
      a slot for insertion of a smartcard arranged at the back plane part, the slot comprising electrical contacts for connecting to the smartcard when inserted;

a fingerprint reader; and
circuitry connected to the electrical connector, the electrical contacts and the fingerprint reader,
wherein the first body comprises a part that is arranged to abut to at least one of the lateral sides of the electronic device when attached,
the apparatus further comprising
a support arranged to keep the apparatus fixed to the electronic device when attached by abutting at least one further lateral side of the electronic device when attached;
a second body arranged to mate with the first body when attaching to the electronic device, wherein the second body comprises the support
wherein the first body is arranged to be slid onto the electronic device from a lateral side thereof, and the second body comprises a back plane and is arranged to be slid onto the electronic device from an opposite lateral side thereof, and the first and second bodies are arranged to snap lock at a position of mating of the back planes of the first and second bodies, and
wherein the second body comprises a slot for insertion of a smartcard arranged at the back plane thereof such that, when attached to the electronic device, the slots of the back planes of the first and second body form the slot for insertion of the smartcard, and wherein at least a part of the back plane of the second body is transparent such that printed information of the smartcard is visible through the back plane of the second body when the smartcard is inserted.

2. The apparatus according to claim 1, wherein the back plane of the first body comprises a surface essentially transversal to the sliding direction and a surface essentially longitudinal to the sliding direction, and the back plane of the second body comprises a surface essentially transversal to the sliding direction and a surface essentially longitudinal to the sliding direction such that the respective transversal and longitudinal surfaces mate when attached to align the first and second bodies when attached to the electronic device.

3. The apparatus according to claim 1, wherein the first body is arranged onto the electronic device, and the second body comprises lateral sides and is arranged to slide onto the electronic device such that the second body encases at least one lateral side of the electronic device and at least one lateral side of the first body, and the first and second bodies are arranged to mutually snap lock.

4. The apparatus according to claim 1, wherein the first body comprises the support, and the back plane is resilient such that when attaching the apparatus to the electronic device, the support and the part abuts at least two opposite lateral sides of the electronic device.

5. The apparatus according to claim 4, wherein the slot for insertion of the smartcard is a groove arranged on a side of the back plane proximal to the electronic device when attached such that the smartcard is kept in place by the groove and the electronic device when attached.

6. The apparatus according to claim 1, wherein the fingerprint reader is a line sensor arranged to read a fingerprint upon sliding a finger over the sensor and sequentially reading a plurality of images thereof, and the apparatus further comprising a guide protrusion or guide groove arranged to provide a tactile direction indicator transversal to the elongation of the line sensor.

7. The apparatus according to claim 1, wherein the fingerprint reader is arranged to read a fingerprint from a finger held still against the reader during reading, and the apparatus further comprising a guide protrusion or groove arranged to provide a tactile indicator enabling the user to position the finger properly in sense of position and/or direction to the reader.

8. The apparatus according to claim 1, further comprising one or more recess arranged to provide access, when attached to the electronic device, for any of:
a camera of the electronic device;
a speaker of the electronic device;
a microphone of the electronic device; and
a button of the electronic device.

9. The apparatus according to claim 1, further comprising a Universal Serial Bus, USB, connector arranged to enable connection to a USB host, wherein the USB connector is connected to the circuitry connected to the electrical connector.

10. The apparatus according to claim 1, wherein the circuitry connected to the electrical connector is controlled by a processor on which a hardware-interfacing software is executed for performing the control, and upon the electronic device being arranged to interact with the apparatus under control of an executed application, any update of the hardware-interfacing software is provided through an update of the application of the electronic device.

11. The apparatus according to claim 1, wherein the circuitry connected to the electrical connector is arranged for extracting features from a fingerprint image read by the fingerprint reader.

12. An apparatus for attaching to an electronic device, the electronic device comprising an electrical connector, a back side, a display arranged on a side opposite to the back side, and lateral sides connecting the back side and the side opposite to the back side, the apparatus comprising
a first body comprising
a back plane arranged to cover at least a part of the backside of the electronic device when attached;
an electrical connector arranged to mate the electrical connector of the electronic device when attached;
a slot for insertion of a smartcard arranged at the back plane part, the slot comprising electrical contacts for connecting to the smartcard when inserted;
a fingerprint reader; and
circuitry connected to the electrical connector, the electrical contacts and the fingerprint reader,
wherein the first body comprises a part that is arranged to abut to at least one of the lateral sides of the electronic device when attached,
the apparatus further comprising
a support arranged to keep the apparatus fixed to the electronic device when attached by abutting at least one further lateral side of the electronic device when attached;
a second body arranged to mate with the first body when attaching to the electronic device, wherein the second body comprises the support
wherein the first body is arranged to be slid onto the electronic device from a lateral side thereof, and the second body comprises a back plane and is arranged to be slid onto the electronic device from an opposite lateral side thereof, and the first and second bodies are arranged to snap lock at a position of mating of the back planes of the first and second bodies, and
wherein the back plane of the second body comprises a recess or cavity at an outer part thereof such that the smart card, when inserted, is accessible to be removed.

13. An apparatus for attaching to an electronic device, the electronic device comprising an electrical connector, a back side, a display arranged on a side opposite to the back side, and lateral sides connecting the back side and the side opposite to the back side, the apparatus comprising a first body comprising a back plane arranged to cover at least a part of the backside of the electronic device when attached;

an electrical connector arranged to mate the electrical connector of the electronic device when attached;

a slot for insertion of a smartcard arranged at the back plane part, the slot comprising electrical contacts for connecting to the smartcard when inserted;

a fingerprint reader; and circuitry connected to the electrical connector, the electrical contacts and the fingerprint reader, wherein the first body comprises a part that is arranged to abut to at least one of the lateral sides of the electronic device when attached, the apparatus further comprising a support arranged to keep the apparatus fixed to the electronic device when attached by abutting at least one further lateral side of the electronic device when attached;

a second body arranged to mate with the first body when attaching to the electronic device, wherein the second body comprises the support wherein the first body is arranged to be slid onto the electronic device from a lateral side thereof, and the second body comprises a back plane and is arranged to be slid onto the electronic device from an opposite lateral side thereof, and the first and second bodies are arranged to snap lock at a position of mating of the back planes of the first and second bodies, and wherein the electronic device is arranged to, through its electrical connector, detect an accessory by identifying on one or more of its pins a short circuit to ground and/or a predefined resistance to ground, the circuitry further comprising a controllable impedance circuit arranged to provide, to the one or more corresponding pins of the electrical connector of the first body, short circuit and/or a predefined resistance to ground corresponding to a selected mode of operation of the apparatus.

14. The apparatus according to claim 13, wherein the impedance circuit comprises a first junction field effect transistor, JFET, connected with its source to a ground potential, its drain to a first one of the one or more pins corresponding to accessory detection pins, and its gate connected to a voltage supply source of, or connectable to, the apparatus, via a resistor and the gate is further connected to a first control switch of the circuitry arranged to selectably short circuit the gate voltage to a ground voltage.

15. The apparatus according to claim 14, further comprising a Universal Serial Bus, USB, connector arranged to enable connection to a USB host, wherein the USB connector is connected to the circuitry, wherein the voltage supply source is provided through the USB connector.

16. The apparatus according to claim 13, wherein the impedance circuit comprises a second junction field effect transistor, JFET, connected with its source to a ground potential, its drain to a second one of the one or more pins corresponding to accessory detection pins via a resistor of a predefined size, and its gate connected to a voltage supply source of, or connectable to, the apparatus, via a resistor and the gate is further connected to a second control switch of the circuitry arranged to selectably short circuit the gate voltage to a ground voltage.

* * * * *